(No Model.)

H. C. BEHRENS.
FISHING LINE SPREADER.

No. 353,412. Patented Nov. 30, 1886.

Witnesses:
Wilson Ringle
Charles H. Smiley

Inventor:
Henry C. Behrens
By Boyden, Bailie & Mason
Attys.

UNITED STATES PATENT OFFICE.

HENRY C. BEHRENS, OF BALTIMORE, MARYLAND.

FISHING-LINE SPREADER.

SPECIFICATION forming part of Letters Patent No. 353,412, dated November 30, 1886.

Application filed July 28, 1886. Serial No. 209,350. (No model.)

*To all whom it may concern:*

Be it known that I, HENRY C. BEHRENS, a citizen of the United States, residing at Baltimore, in the State of Maryland, have invented certain new and useful Improvements in Fishing-Line Spreaders; and I do hereby declare the following to be a full, clear, and exact description of the invention, such as will enable others skilled in the art to which it appertains to make and use the same.

My invention relates to improvements in fishing-tackle, wherein is provided a telescopic fishing-line spreader, which is so constructed that it can be closed and closely stowed for transportation, and extended to any position and properly secured thereat when in use, as illustrated in the accompanying drawings, in which—

Figure 1:
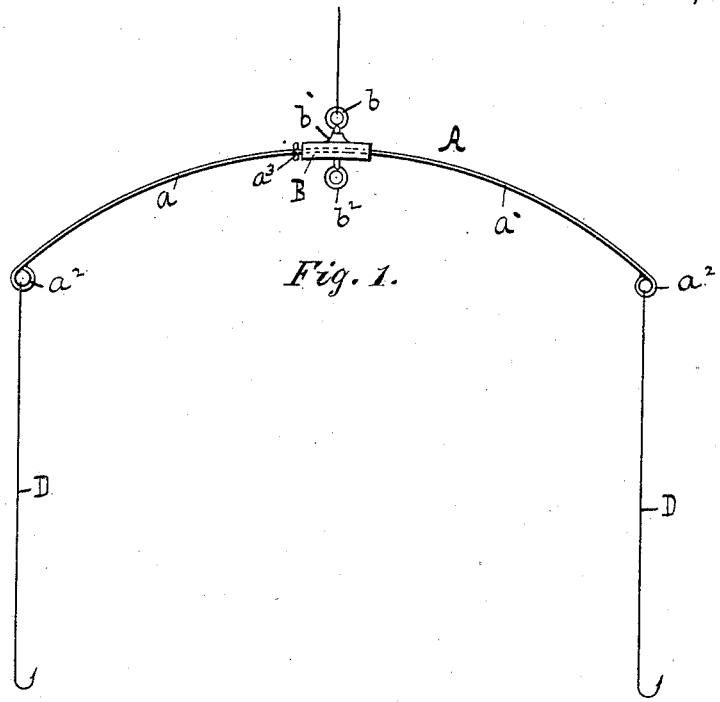
Figure 2:
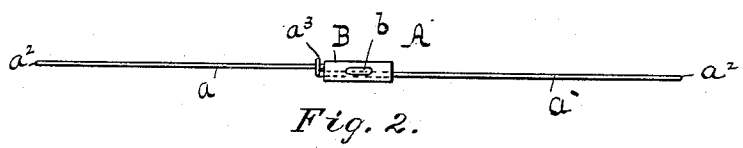
Figure 3:
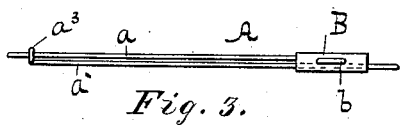
Figure 4:
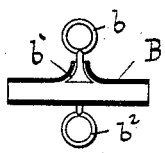

Figure 1 is a front view of the device, showing the spreader extended. Fig. 2 is a plan of Fig. 1. Fig. 3 is a plan showing the spreader closed. Fig. 4 is a detail view of the crown or standing part of the spreader.

Similar letters refer to similar parts throughout the several views.

The letter A designates the spreader, which may be constructed of wire or any suitable elastic material, and consists of the crown B and the arms $a$ and $a'$. The crown B is constructed of tubing, and is provided with the swivel-eye $b$, which is secured to the crown B by means of the swivel-joint $b'$, thus permitting the eye $b$ to revolve freely in the crown. The said crown is further provided with the fixed eye $b^2$, to which is attached the sinking-weight. To the crown B is rigidly fixed the arm $a$, which terminates in the eye $a^2$, and to which is attached the fishing-snood D. The arm $a'$ moves freely through the crown B, and is provided at its outer end with the eye $a^2$, to which is attached the snood D, and at its inner end is fixed the ring-stop $a^3$, which prevents the said arm from being pulled completely through the crown, and which serves to hold the parts together when the device is closed. It is obvious that the arm $a$ may also be constructed to work freely through the crown B, thus having both arms $a$ and $a'$ moving freely through the crown B. It is preferred, however, to arrange it as illustrated, as this method preserves greater rigidity to the spreader. By this construction the spreader can be closed, thus occupying but little space when not in use, and preserving its curved form when extended for operation.

In preparing the device for use, the arms $a$ and $a'$ are extended, the said arms $a$ and $a'$ moving sufficiently tight in the crown B to hold the position at which they are set. The fishing-snoods D D are secured to the eyes $a^2$ $a^2$ in the arms $a$ and $a'$, and the sinking-weight is secured in the fixed eye $b^2$ in the crown B, the said eye $b$ being swivel-jointed, which permits the spreader to revolve freely, and prevents the twisting of the line.

Having described my invention, what I desire to secure by Letters Patent is—

1. A fishing-line spreader constructed to be opened or closed by one part sliding on the other, for the purpose set forth.

2. In a fishing-line spreader, the combination of the arms $a$ and $a'$, one sliding upon the other, and the crown-piece B, for the purpose set forth.

In testimony whereof I affix my signature in presence of two witnesses.

HENRY C. BEHRENS.

Witnesses:
 CHAS. W. SMILEY,
 JNO. T. MADDOX.